United States Patent [19]

Kawase et al.

[11] Patent Number: 4,787,668
[45] Date of Patent: Nov. 29, 1988

[54] WEATHER STRIP

[75] Inventors: Haruhisa Kawase; Yoshinobu Suzuki; Masahiro Nozaki, all of Aichi, Japan

[73] Assignee: Toyoda Gosei Co., Ltd., Nishikasugai, Japan

[21] Appl. No.: 159,428

[22] Filed: Feb. 17, 1988

Related U.S. Application Data

[63] Continuation of Ser. No. 921,814, Oct. 21, 1986, abandoned, which is a continuation of Ser. No. 713,683, Mar. 20, 1985, abandoned.

[30] Foreign Application Priority Data

Mar. 21, 1984 [JP] Japan ................... 59-54934

[51] Int. Cl.$^4$ .............................. B60J 1/02; B60J 1/20
[52] U.S. Cl. ..................... 296/93; 296/201; 49/480; 49/491; 49/497; 52/400; 52/403
[58] Field of Search ............... 296/93, 201, 202, 154; 49/480, 485, 486, 490, 491, 496, 497; 52/208, 400, 403, 713

[56] References Cited

U.S. PATENT DOCUMENTS

| | | | |
|---|---|---|---|
| 2,899,721 | 8/1959 | Herman | 49/497 |
| 3,167,856 | 2/1965 | Zoller | 49/490 X |
| 3,222,769 | 12/1965 | Le Plae | 49/490 X |
| 4,092,813 | 6/1978 | Eggert | 52/716 X |
| 4,123,100 | 10/1978 | Ellis | 296/93 |
| 4,223,081 | 11/1980 | Pullan | 49/490 X |
| 4,263,750 | 4/1981 | Hein | 49/490 |
| 4,343,845 | 8/1982 | Burden et al. | 49/490 X |
| 4,447,065 | 5/1984 | Dupuy et al. | 49/491 X |
| 4,472,469 | 9/1984 | Thies | 49/490 X |
| 4,488,753 | 12/1984 | Koike | 52/208 |
| 4,495,234 | 1/1985 | Tominaga | 49/490 X |
| 4,496,186 | 1/1985 | Tuchiya | 296/93 X |

FOREIGN PATENT DOCUMENTS

| | | | |
|---|---|---|---|
| 295151 | 11/1967 | Australia . | |
| 2649422 | 5/1977 | Fed. Rep. of Germany | 293/128 |
| 2748682 | 5/1978 | Fed. Rep. of Germany | 49/491 |
| 2942949 | 5/1981 | Fed. Rep. of Germany | 49/497 |
| 3347305 | 7/1984 | Fed. Rep. of Germany | 296/93 |
| 58-48199 | 11/1983 | Japan . | |
| 2099489 | 12/1982 | United Kingdom | 49/497 |

Primary Examiner—Robert B. Reeves
Assistant Examiner—Russell D. Stormer
Attorney, Agent, or Firm—Cushman, Darby & Cushman

[57] ABSTRACT

Disclosed is a weather strip comprising: (a) a solid rubber made retainer; (b) a plurality of retainer lips projecting from the inside of the retainer, the retainer lips being arranged to oppose each other and adapted such that the flange of an automobile body is inserted into the space formed by the opposing retainer lips; and (c) a projection which is provided on the end of at least one pair of the retainer lips among the plurality of retainer lips and projects toward the innermost surface of the retainer so as to be pressure-contacted by the flange of the automobile body. The pair of retainer lips having the projection come into contact with each other at the portion where the projections are provided and open gradually toward the open end of the retainer. Two pairs of retainer lips are provided inside the retainer, toward the open end and the innermost surface opposing the open end, respectively, and the pair of retainer lips having the projection is that which is located close to the innermost surface of the retainer.

2 Claims, 6 Drawing Sheets

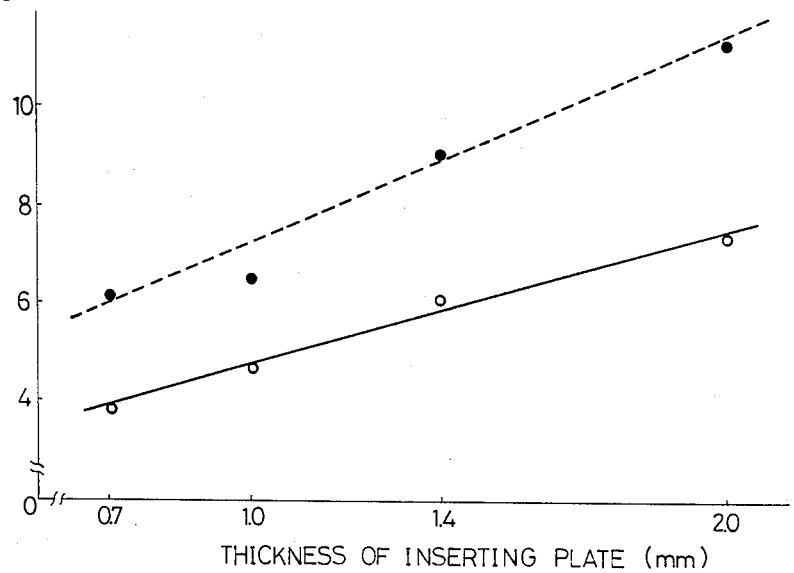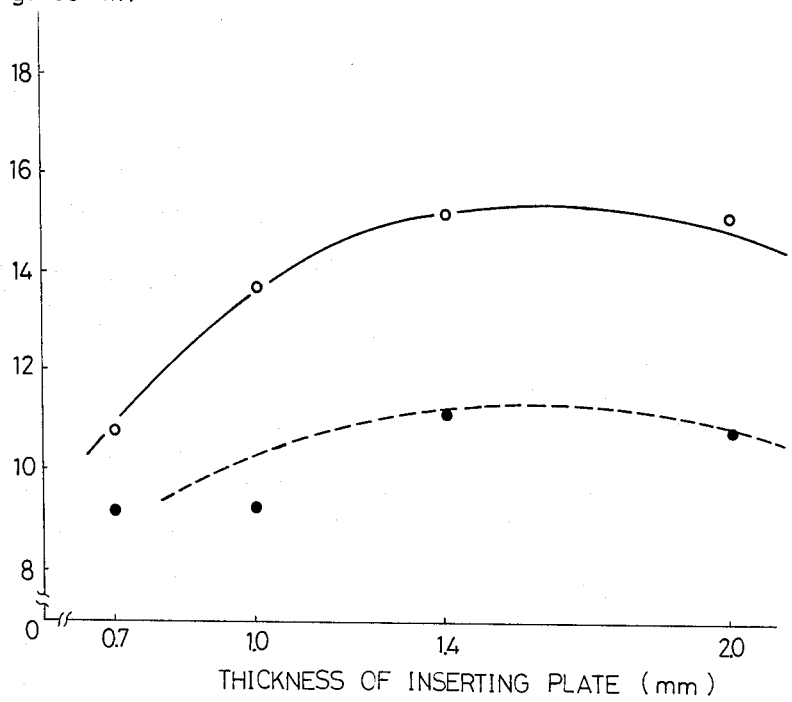

WEATHER STRIP

This is a continuation of application Ser. No. 921,814, filed Oct. 21, 1986, which was a continuation of Ser. No. 713,683, filed Mar. 20, 1985, both abandoned.

BACKGROUND OF THE INVENTION

1. Field of the Invention

The present invention relates to a weather strip for an automobile.

2. Description of the Prior Art

Description will be made of a conventionally used weather strip with reference to FIGS. 1 and 2. In FIG. 1, reference numeral O denotes the outside of an automobile body, and reference numeral I the inside of the automobile body. Reference numeral 21 denotes a door panel, and reference numeral 22 a body panel. Reference numeral 23 denotes an inner panel provided on the inside of the body panel 22. Reference numeral 24 denotes a flange portion in which the flanges of both the body panel 22 and the inner panel 23 are brought together and welded to each other. To the flange portion 24 is fitted a weather strip 26 having a retainer 29 with a U-shaped cross section as well as a hollow and cylindrically shaped sponge seal 25 on the outer side of the retainer 29 facing away from the flange.

A reinforcing core metal 27 is embedded inside the retainer 29, and a plurality of retainer lips are provided on the inner side of the retainer 29 in such a manner as to project therefrom and enhance its ability to grip the flange portion 24. The retainer 29 and the retainer lips 28 are formed integrally of solid rubber.

Incidentally, the weather strip 26 must meet two contradictory requirements in the sense that the force (inserting force) required to fit the weather strip 26 to the flange portion 24 should be small and the retaining force for opposing any withdrawal force applied after installation should be large.

To this end, each of the retainer lips 28 has conventionally been made into one 28a with a large thickness, as shown in FIG. 2. In such an arrangement, however, the space between the opposing surfaces of the retainer lips 28a expands, causing the sides of the retainer 29 to move apart. Consequently, various troubles can arise such as the installed weather strip 26 coming off the flange portion 24, and it thus becomes impossible to obtain the desired effects.

BRIEF SUMMARY OF THE INVENTION

An object of the present invention is to provide a weather strip which makes it possible to employ a small amount of force when fitting the weather strip to the flange portion and, at the same time, enhance the retaining force for gripping the flange portion.

Another object of the present invention is to provide a weather strip which makes it possible to prevent the retainer from releasing its grip from the flange portion and coming off after being fitted thereto, and which makes it possible to improve its adaptability to efficient installation in relation to any curved portion to which it is to be fitted, such as a portion of an automobile body.

Other and further objects of this invention will become obvious upon gaining an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIGS. 9 and 10 are diagrams illustrating the measurement results thereof;

DETAILED DESCRIPTION OF THE PREFERRED EMBODIMENTS

An embodiment of the present invention will be described hereinafter with reference to FIGS. 4 and 5.

Figure 4:
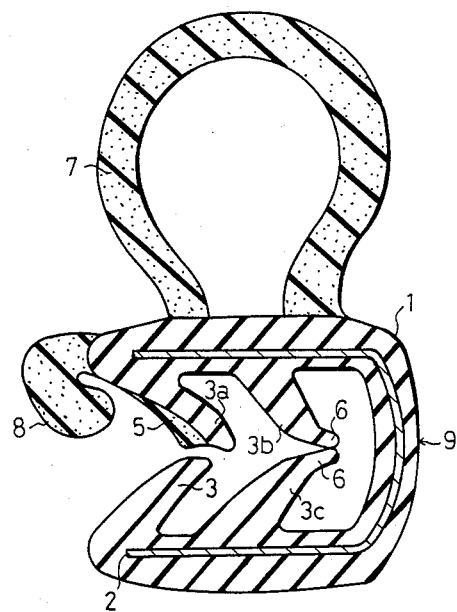
FIGS. 4 and 5 are cross-sectional views of a first embodiment of the present invention.

In FIG. 4, a reinforcing core metal 2 is embedded inside a channel-shaped retainer 1 with a U-shaped cross section which is formed by EPDM (ethylene-propylene) solid rubber.

A plurality of flanged-like retainer lips 3, 3a, 3b, and 3c made of EPDM solid rubber are formed integrally on both sides of the inner surface of the retainer 1. An EPDM sponge rubber 5 is vulcanized and adhered to one surface of the retainer lip 3a which is closer to the outside of the body and to the body panel (not shown) of which a flange 4 forms part, said surface being that which comes into contact with the flange 4. Also, a projection or sublip 6 is provided on each end of the pair of retainer lips 3b and 3c which together form the inner pair of retainer lips, in such a manner as to project toward the innermost surface of the retainer 1 which opposes its open end. As shown in FIG. 4, at the time when the retainer 1 is fitted to the flange 4, the tips of both projections 6 come into contact with each other, and the space between both retainer lips 3b and 3c opens gradually toward the open end of the retainer 1. Furthermore, the overall projections 6 of both retainer lips 3b and 3c are adapted to come into contact with the flange surface when the retainer 1 is fitted to the flange 4, as shown in FIG. 5. Incidentally, the retainer lips 3b and 3c are formed with a thickness which is smaller than that of the conventional retainer lip 28.

A hollow and cylindrically shaped sealing portion 7 made of an EPDM sponge is vulcanized and adhered to a portion of the retainer 1 which faces the outside of the body. In addition, a dripping portion 8 made of the EPDM sponge described above is vulcanized and adhered to the retainer 1 at its open end on the side which faces the outside of the body.

At the time of fitting a weather strip 9 having the aforementioned arrangement to the flange 4, friction between the flange 4 and the retainer lip 3a is reduced during the fitting since the EPDM sponge rubber 5 is adhered to the retainer lip 3a. Additionally, since the retainer lips 3b and 3c open gradually toward the open end of the retainer 1, as mentioned earlier, the retainer 1 can be fitted smoothly with reduced force.

Figure 1:
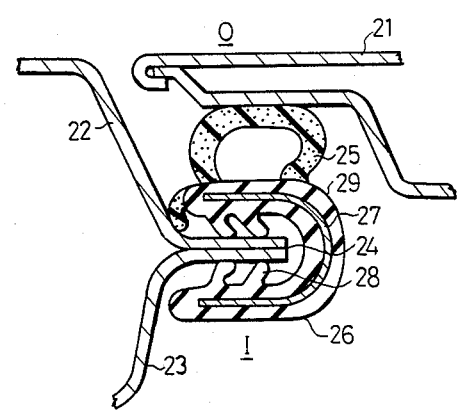
FIG. 1 is a cross-sectional view of a conventional weather strip.
Figure 2:
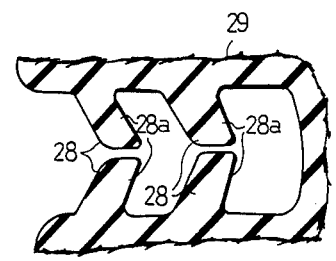
FIG. 2 is an enlarged view of its lip portion.
Figure 3:
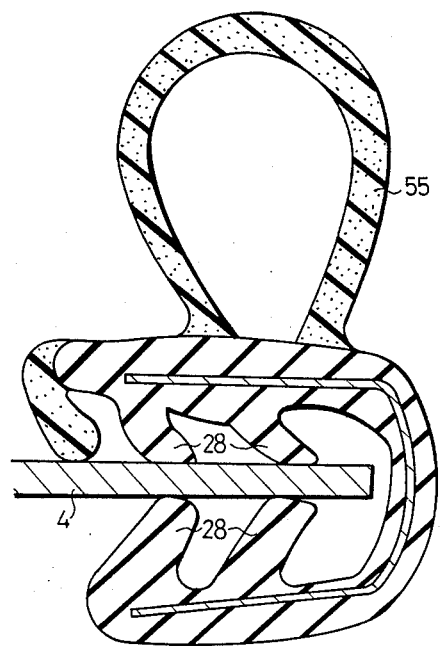
FIG. 3 is a cross-sectional view of a conventional weather strip installed on a flange portion.
Figure 5:
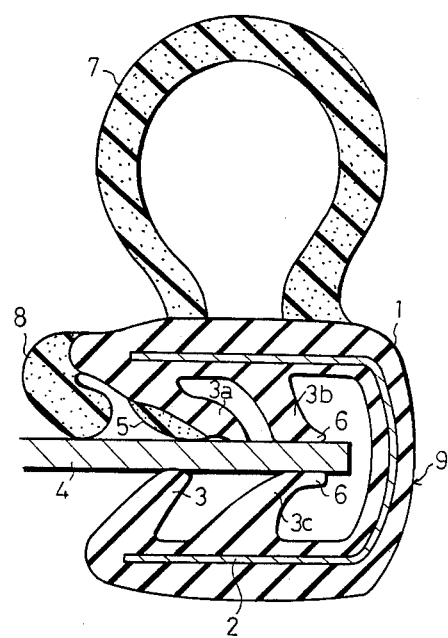

With respect to the retaining force needed after the installation of the retainer 1 on the flange 4, as shown in FIG. 5, this retaining force is increased since the area of contact between the retainer lips 3b and 3c and the flange 4 becomes larger than in the case of the conventional weather strip as shown in FIG. 3.

Figure 6:
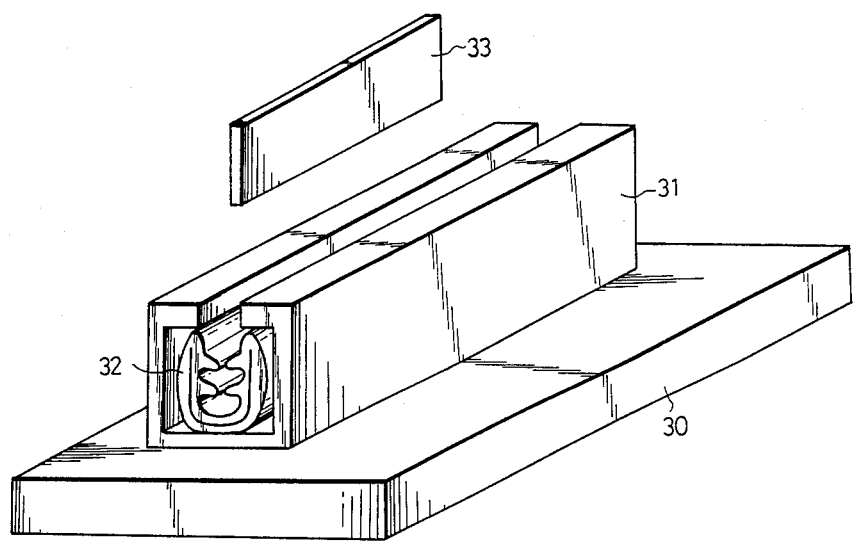
FIGS. 6, 7, and 8 are a perspective view and cross-sectional views of a device for measuring the inserting force and retaining force of the weather strip according to the present invention.
Figure 7:
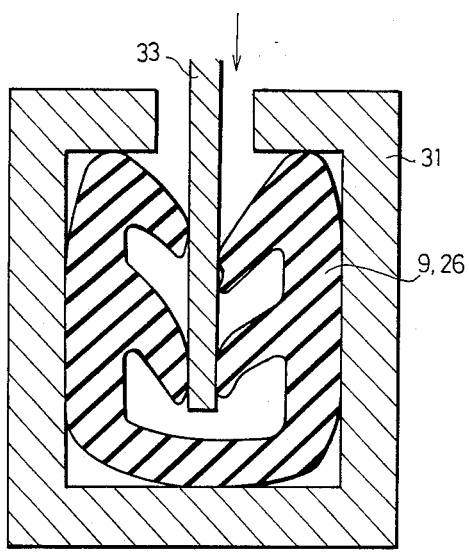
Figure 8:
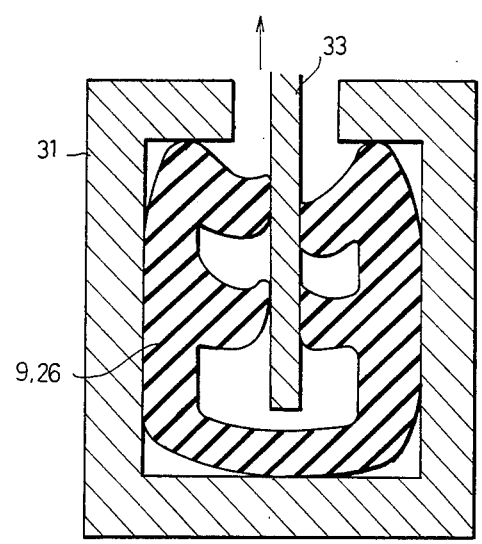

To demonstrate these effects, a test was conducted as shown in FIGS. 6 to 8 and the method and conditions of the test and the like are described in detail in the following. A substantially channel-shaped fixing jig 31 was installed on the upper surface of a fixing plate 30 in such a manner that the opening of the fixing jig 31 faces upward, as shown in FIG. 6. A weather strip 9, 26 is then installed inside the fixing jig 31, as shown in FIG. 7. Then, a rectangular inserting plate 33 with a length of 100 mm and a thickness of 0.7, 1.0, 1.4 or 2.0 mm is inserted into the opening of the weather strip 9, 26 at room temperature at a speed of 20 mm/min. A load measuring machine (a digital load measuring apparatus made by Aikoh Engineering Co., Ltd., Model 1310) is installed on top of the inserting plate 33 so as to measure the inserting force at the time of insertion of the inserting plate 33.

In addition, the retaining force is measured by withdrawing the inserted inserting plate 33, as shown in FIG. 8.

The results of measurement according to the testing method described above are shown in FIGS. 9 and 10. In the figures, the broken line indicates a conventional weather strip, while the solid line indicates the weather strip according to the present invention.

It was confirmed that the inserting force for fitting the weather strip 9 embodying the present invention to the flange 4 can be reduced remarkably as compared with a conventional weather strip 26 irrespective of thickness, as shown in FIG. 9. Furthermore, with respect to the retaining force exhibited after insertion of the flange 4, it was also confirmed that a retaining force much higher than that of a conventional weather strip 26 can be obtained irrespective of thickness, as shown in FIG. 10.

As described in detail above, the weather strip embodying the present invention makes it possible to prevent the retainer 1 from expanding at the time of fitting and eliminates the possibility of it coming off the flange, thereby improving its adaptability to efficient installation at a curved portion, in particular, such as that involved with an automobile body.

Incidentally, the present invention should not be restricted to the arrangement of the aforementioned embodiment, it also being possible to embody the present invention as described below.

Figure 11:
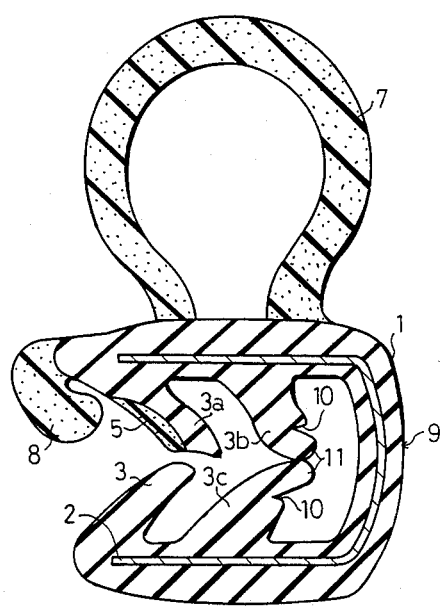
FIGS. 11 to 13 are cross-sectional views illustrating modifications of the first embodiment of the present invention.

As shown in FIG. 11, the inner pair of retainer lips 3b, 3c may be formed with a thickness larger than that of the aforementioned embodiment shown in FIGS. 4 and 5, and each projection 11 may be formed by substantially providing a recess 10 on the underside thereof facing the innermost surface of the retainer 9 which opposes its open end.

Figure 12:
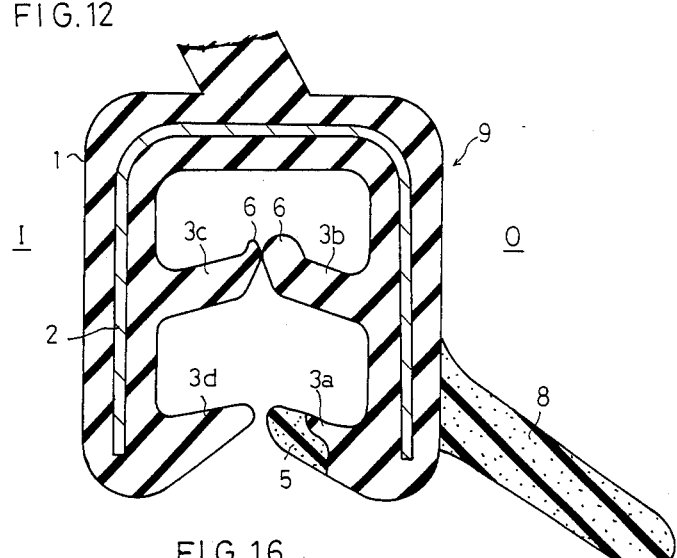
Figure 13:
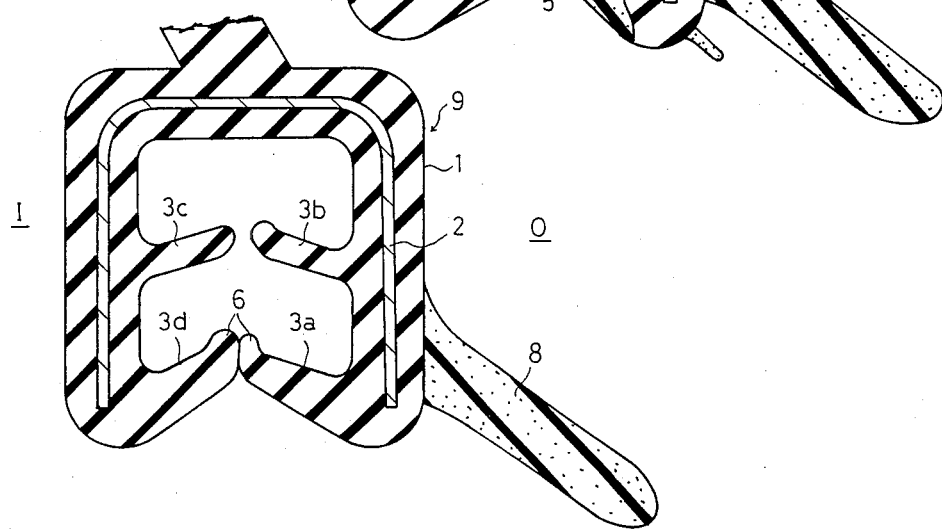

Furthermore, as shown in FIG. 12, the thickness of the projection 6 of the retainer lip 3b located close to the innermost surface of the retainer 9 may be made thicker than the thickness of the projection 6 of the retainer lip 3c opposing it. Additionally, as shown in FIG. 13, the pair of retainer lips 3a and 3d each having a projection 6 may be located close to the open end of the retainer 1, and the thickness of the projection 6 of one retainer lip 3d of these retainer lips may be made thicker than the thickness of the projection 6 of the other retainer lip 3a.

Figure 14:
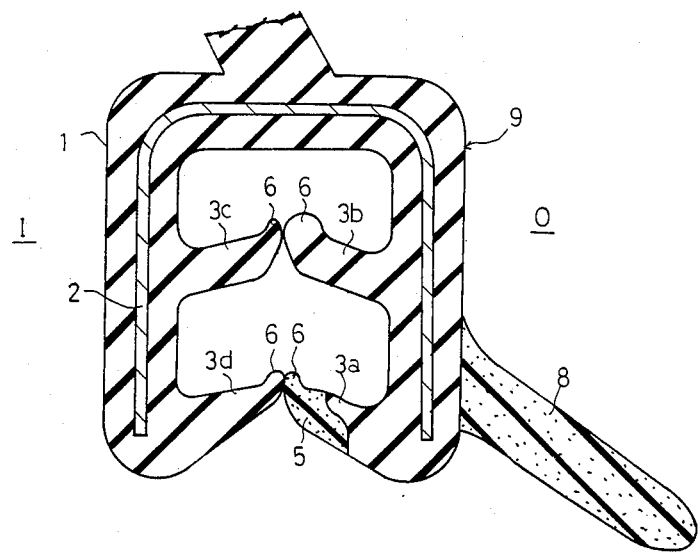
FIG. 14 is a cross section illustrating a second embodiment of the present invention.

Next, a second embodiment of the present invention will be described with reference to FIG. 14. In this weather strip 9 of this embodiment, an EPDM sponge rubber 5 which comes into contact with the flange portion 4 is vulcanized and adhered to the retainer lip 3a located close to the outside of the automobile body and to the open end of the retainer 1. In addition, a projection 6 is provided on the tip of each retainer lip 3a, 3b, 3c, and 3d projecting diagonally toward the innermost bottom surface of the retainer 1. The projection 6 of the retainer lip 3b located close to the outside of the automobile body and to the innermost bottom surface of the retainer 1 is formed thicker than the projections 6 of the other retainer lips 3a, 3c, and 3d. Incidentally, in this embodiment, the thickness of the projections 6 of the retainer lips 3a, 3c, and 3d is 0.5 to 0.8 mm, while the projection 6 of the retainer lip 3b has a thickness of 1.0 to 1.5 mm.

In this embodiment, since the thickness of the projection 6 of the retainer lip 3b is set to be relatively thick, even if a force should act on the retainer 1 toward the inside I of the automobile body on the basis of the pressure-contacting force of the dripping portion 8, the thick portion of the retainer lip 3b is opposed to that force, thereby preventing any inclination of the retainer 1 toward the inside I of the automobile body. Moreover, since only the projection 6 of the retainer lip 3b is made thicker, there is no possibility of the inserting force becoming large or the retaining force declining as compared with a conventional weather strip. This is apparent from the results of the experiment shown in the table below.

Incidentally, the comparative example in the table shows the case where all the projections 6 of the retainer lips 3a, 3b, 3c, and 3d are formed with the same thickness (0.5 to 0.8 mm), while the embodiment shows the case where the projection of the retainer lip 3b alone is made thick (1.0 to 1.5 mm).

TABLE

| Wall thickness (mm) | Comparative Example | | Embodiment | |
| --- | --- | --- | --- | --- |
| | Inserting force | Retaining force | Inserting force | Retaining force |
| 0.7 | 3.9 | 10.85 | 4.0 | 11.0 |
| 1.0 | 4.7 | 13.7 | 4.5 | 13.5 |
| 1.4 | 6.2 | 15.2 | 6.2 | 14.9 |
| 2.0 | 7.5 | 15.2 | 7.8 | 15.3 |

As is evident if comparison is made between the comparative example and the embodiment, it can be understood that there are practically no differences in terms of both the inserting force and the retaining force. In addition, to conduct an experiment on the inclination of the weather strip 9 at the time of its insertion, a method was followed wherein the retainer 1 was pushed in with the fingers and the angle of inclination was measured at the time of releasing the fingers. As a result, in the case of the aforementioned comparative example, the angle of inclination was 7° to 11°, while in the case of the embodiment, the angle of inclination was 2° to 6°, and it thus became clear that the angle of inclination is reduced by half in the latter case.

Figure 15:
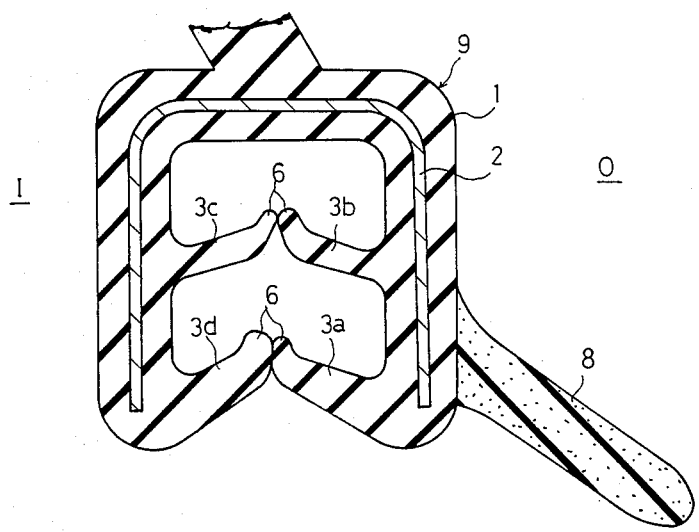

Also, as shown in FIG. 15, in the weather strip of this second embodiment the projection 6 of the retainer lip 3d located close to the inside I of the automobile body and to the open end of the retainer 1 may be relatively thick.

Figure 16:
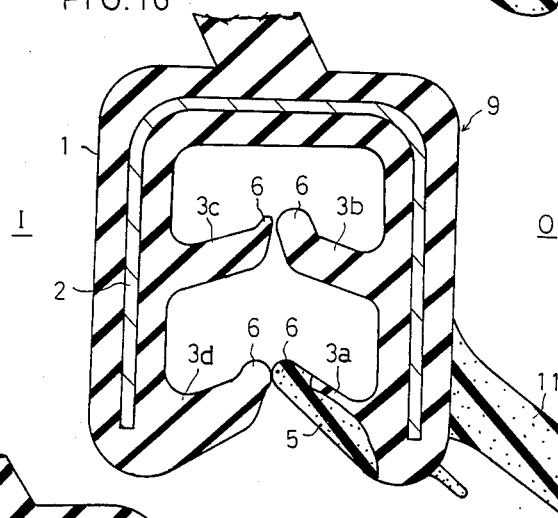
FIGS. 15 and 16 are cross-sectional views illustrating modifications of the second embodiment of the present invention.

Furthermore, as shown in FIG. 16, the projection 6 of the retainer lip 3d located close to the inside I of the automobile body and to the open end of the retainer 1 as well as the projection 6 of the retainer lip 3b located close to the outside 0 of the automobile body and to the inner bottom surface of the retainer 1 may be formed with a greater thickness than the respective projections 6 opposing it.

As has been described in detail, the present invention makes it possible to make small the force employed in fitting the weather strip to the flange and increase the retaining force for gripping the flange, and, at the same time, makes it possible to prevent the retainer from expanding after fitting it to the flange portion so as to eliminate the possibility of it coming off the flange, thereby improving its adaptability to efficient installation in relation to an curved portion to which it is to be fitted, such as a portion of an automobile body.

As many apparently widely different embodiments of this invention may be made without departing from the spirit and scope thereof, it is to be understood that the invention is not limited to the specific embodiments defined in the appended claims.

What is claimed is:

1. A weather strip comprising:
 a channel-shaped solid-rubber retainer having side walls, a bottom wall and an open mouth,
 two pairs of opposed flange-like retainer lips composed at least in part of solid rubber, said retainer lips projecting inward from said side walls with the lips of each of said pairs inclined toward said bottom wall and adapted to receive therebetween, press on, engage and retain said strip on, a flange of an automobile body when said strip is pressed thereon open mouth first, one side of said flange facing the outside of said body;
 a pair of opposed flange-like sub-lips composed at least in part of solid rubber, said sub-lips protruding inward from the tips of the lips of at least that pair of said lips located closer to said retainer bottom wall than the other pair, said sub-lips being inclined toward said bottom wall at a greater angle than that of said lips and facing said open mouth being divergent theretoward, said sub-lips having convexly rounded tips and being substantially devoid of concave surfaces and the sides thereof being disposed generally at an angle other than zero with respect to the corresponding sides of their respective lips,
 at least the side portion of one of the lips of the other pair closest the retainer open mouth, and which lip side portion faces said open mouth and inward of said body, being made of sponge rubber,
 whereby the area of contact of said retainer with said flange is increased with resultant increase of the retaining force of said retainer while the force required to press said retainer on said flange is reduced.

2. The strip defined in claim 1 wherein the thickness of the sub-lip on the lip projecting from the side wall facing outward of the body is greater than that of the other opposed sub-lip.

* * * * *